US009316721B2

(12) United States Patent
Bocquet et al.

(10) Patent No.: US 9,316,721 B2
(45) Date of Patent: Apr. 19, 2016

(54) METHOD AND SYSTEM FOR ESTIMATING THE LOCATION OF A MOBILE TERMINAL

(75) Inventors: Wladimir Bocquet, Maisons Laffitte (FR); Shinya Tsutsumi, Hannan (JP); Tomofumi Yabu, Kishiwada (JP)

(73) Assignee: Orange, Paris (FR)

( * ) Notice: Subject to any disclaimer, the term of this patent is extended or adjusted under 35 U.S.C. 154(b) by 304 days.

(21) Appl. No.: 13/120,722

(22) PCT Filed: Sep. 24, 2009

(86) PCT No.: PCT/EP2009/062374
§ 371 (c)(1),
(2), (4) Date: Mar. 24, 2011

(87) PCT Pub. No.: WO2010/034769
PCT Pub. Date: Apr. 1, 2010

(65) Prior Publication Data
US 2011/0177828 A1    Jul. 21, 2011

(30) Foreign Application Priority Data

Sep. 26, 2008    (EP) .................................... 08305605

(51) Int. Cl.
*H04W 24/00*    (2009.01)
*G01S 5/14*    (2006.01)
*G01S 5/02*    (2010.01)

(52) U.S. Cl.
CPC .................. *G01S 5/14* (2013.01); *G01S 5/0205* (2013.01); *G01S 5/0221* (2013.01)

(58) Field of Classification Search
CPC ....... H04W 64/00; H04W 4/02; H04W 4/023; H04W 64/006; H04W 4/025; H04W 24/10; H04W 4/04; H04W 56/001; H04W 56/0015; H04W 56/002; G01S 5/0252; G01S 5/14; G01S 5/021; G01S 5/0278; G01S 5/06
See application file for complete search history.

(56) References Cited

U.S. PATENT DOCUMENTS

| 2003/0191604 | A1 | 10/2003 | Kuwahara et al. |
| 2004/0203420 | A1 | 10/2004 | Rick et al. |
| 2005/0003828 | A1* | 1/2005 | Sugar et al. ................. 455/456.1 |
| 2006/0160545 | A1* | 7/2006 | Goren et al. ................ 455/456.1 |
| 2006/0232473 | A1 | 10/2006 | Seibert |
| 2008/0261623 | A1* | 10/2008 | Etemad et al. ............. 455/456.2 |

FOREIGN PATENT DOCUMENTS

WO    2004/081601 A1    9/2004

OTHER PUBLICATIONS

Gezici et al., "Ranging in a Single-Input Multiple-Output (SIMO) System," IEEE Communications Letters, IEEE Service Center, Piscataway, NJ, US, vol. 12 (3), pp. 197-199 (Mar. 1, 2008).

* cited by examiner

*Primary Examiner* — Kwasi Karikari
(74) *Attorney, Agent, or Firm* — Drinker Biddle & Reath LLP (57) ABSTRACT

A method and system are provided for estimating the location of a mobile radio-communication terminal, the mobile terminal having a plurality of antennas, and being in communication range of at least one transmitter having a plurality of antennas, the method comprising: measuring the time of arrival of a signal transmitted from the M antennas of the at least one transmitter at each of the N antennas of the mobile terminal to determine M×N range measurements corresponding to the M×N transmission paths of said signal between the M antennas of the transmitter and the N antennas of the mobile terminal; and estimating the location of the mobile terminal based on the M×N range measurements. The location of the mobile terminal may be estimated by applying a least squares method.

10 Claims, 5 Drawing Sheets

METHOD AND SYSTEM FOR ESTIMATING THE LOCATION OF A MOBILE TERMINAL

CROSS-REFERENCE TO RELATED APPLCIATIONS

This application is the U.S. national phase of the International Patent Application No. PCT/EP2009/062374 filed Sep. 24, 2009, which claims the benefit of European Application No. 08305605.1 filed Sep. 26, 2008, the entire content of which is Incorporated herein by reference.

FIELD OF THE INVENTION

The present invention relates in general to radio transmissions and in particular to a method and system for estimating the location of a mobile terminal. The invention further relates to a location estimation module and a mobile telecommunication terminal comprising such a location estimation module.

BACKGROUND

Localisation of a mobile terminal such as User Equipment (UE) involves determining an estimate of the geographical location of the mobile terminal. Location estimation of a mobile terminal is becoming increasingly important in wireless applications since it enables location dependent applications to be implemented, for example, in location based services and context awareness applications. Such services and applications may include, for example, accessing local emergency services, or providing users with useful information based on their geographical position such as the location of the nearest service station or restaurant. Consequently, the integration of location capability is becoming a mandatory feature on some UEs.

Existing solutions for localising mobile terminals are based on the determination of the propagation delay of a given signal emitted by an antenna of a transmitter (e.g. a Base Station (BS)) to a given mobile terminal. The determined propagation delay allows the distance between the transmitter and the mobile terminal to be calculated and thus the position of the mobile terminal to be derived by, for example, using several transmitters and a traditional triangulation method known to the man skilled in the art.

Figure 1A:
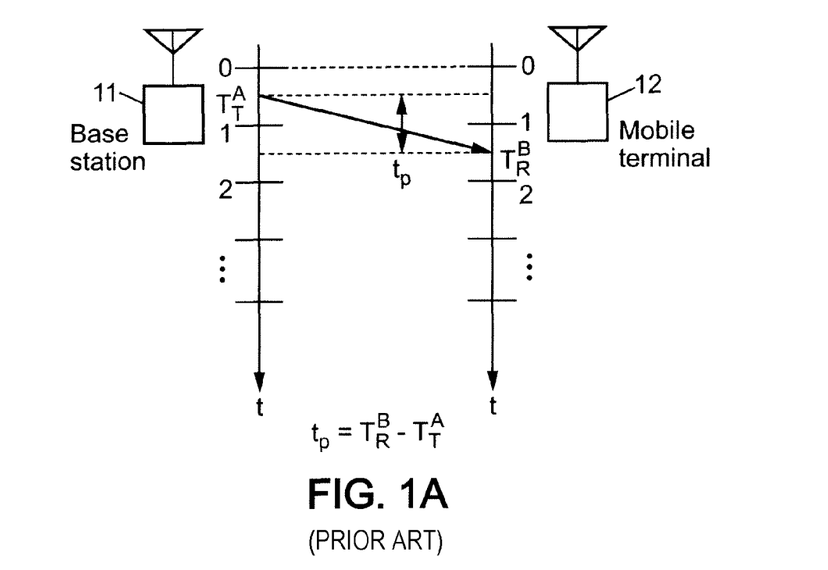
FIG. 1A is a schematic diagram of an example of a time of arrival ranging method in which a base station and a mobile terminal have synchronised clocks.

One existing solution for determining the distance between a transmitter and a UE using the propagation delay $t_p$ is illustrated in FIG. 1A. This technique is sometimes referred to as the Time of Arrival (TOA) or One-Way (OW) ranging (i.e. distance estimation) method. A signal or electromagnetic wave is sent in the form of packets from a transmitter 11 to a mobile terminal 12. The transmitter 11 and the mobile terminal 12 are, in this case, synchronized in time as well as frequency. Assuming that the velocity of the signal (i.e. an electromagnetic wave) is equal to c and that the propagation delay of a given transmitted packet is $t_p$, an estimation of the distance between the transmitter 11 and the mobile terminal 12 may be given by:

$$d = t_p/c \quad (1)$$

$$t_p = T_R^B - T_T^A \quad (2)$$

where $T_T^A$ and $T_R^B$ are, respectively, the departure time of the signal from the transmitter 11, and the arrival time of the transmitted packet at the mobile terminal 12. In this solution, a packet is sent only in the direction from the transmitter 11 to the mobile terminal 12.

Figure 1B:
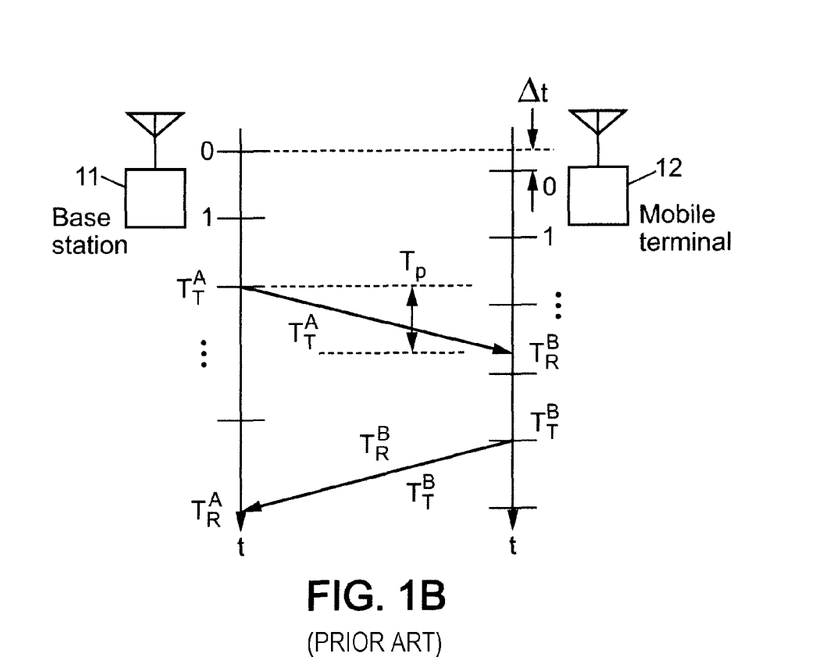
FIG. 1B is a schematic diagram of an example of a two way ranging method in which a base station and a mobile terminal do not have synchronised clocks.

In some cases, a transmitter and a mobile terminal may not have a common clock (i.e. may not be synchronized in time), because they are located in distant locations to one other. If there is a time offset Δt between the clock of the transmitter and the clock of the mobile terminal, an accurate determination of the propagation delay $t_p$ may be made as depicted in FIG. 1B by taking this time offset into account. FIG. 1B illustrates the principle of Two-Way Ranging (TWR) method, in which a transmitter 11 sends a first data packet to a mobile terminal 12 and the mobile terminal 12 sends a second packet to the transmitter 11. The departure time of the first packet from the transmitter and its arrival time at the terminal are respectively denoted $T_T^A$ and $T_R^B$. The departure time of the second packet from the UE and its arrival time at transmitter are respectively denoted $T_T^B$ and $T_R^A$. Using the time offset Δt and the propagation delay $t_p$:

$$T_T^A + t_p = T_R^B + \Delta t$$

$$T_R^A - \Delta t = T_T^B + t_p \quad (3) \& (4)$$

and, finally:

$$d = t_p/c \quad (5)$$

$$t_p = \frac{(T_R^A - T_T^A) - (T_T^B - T_r^B)}{2}$$

The departure time of a packet from a transmitter can be provided as a time stamp included in the data field of the transmitted data packet. In the case of the receiver, however, the receiver of the mobile terminal should be able to accurately estimate the arrival time of the data packet. This may be done by detecting the first arrival path in the estimated impulse response of the receiver to the incoming signal.

Figure 1C:
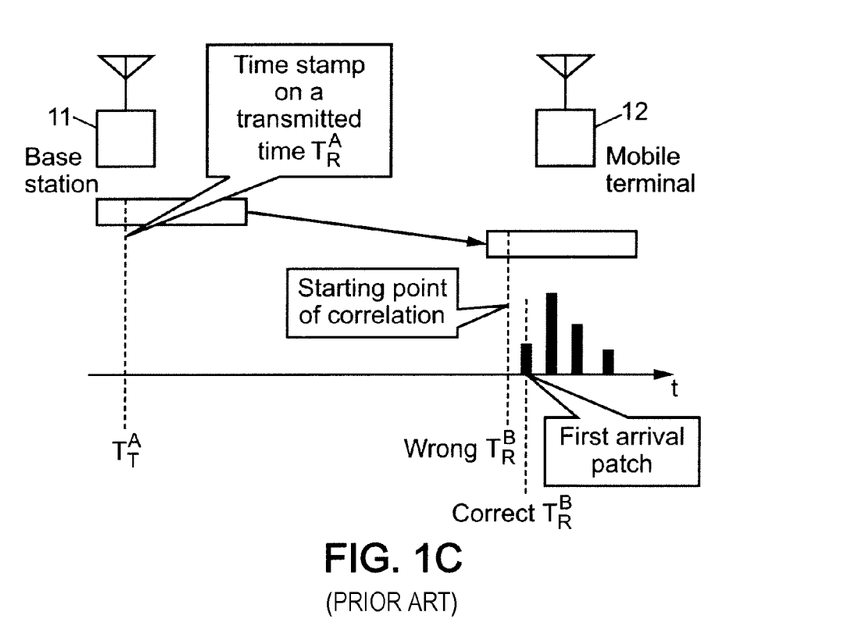
FIG. 1C is a schematic diagram illustrating the general principle of first arrival path detection.

In telecommunications systems such as 3 G and 3.9 G systems a wideband signal such as a spread spectrum (SS) signal with good auto-correlation characteristics is generally employed. The receiver can thereby estimate the impulse response with a SS signal embedded in a data packet transmitted from the transmitter. In such a case, the receiver can select a starting point of a correlation window in the preamble where the SS signal is embedded. The time occurrence of the first arrival path is used to indicate the arrival time of the packet. The first arrival path refers to the path with the shortest delay in the multi-path profile of the receiver response, and thus corresponds to the shortest propagation path between the transmitter and the receiver. The first arrival path detection method consists thus in detecting at the receiver the first impulsion of a given impulse response to a received SS signal as illustrated on FIG. 1C. The receiver should accurately estimate the time of the first arrival path in order to estimate the time of arrival of the packet from the transmitter. This estimation can then in turn give a measurement of the distance between the transmitter and the receiver. In FIG. 1C, Δt corresponds to the time difference between the starting point of correlation of arrival of the packet containing the SS signal and the actual arrival time of the SS signal represented by the time occurrence of the first impulsion of the receiver response. Using the time stamp indicating the departure time, and the time of the first arrival path, the propagation distance between the transmitter and the receiver may be determined, and used to estimate the co-ordinates of the receiver.

Existing solutions for estimating the propagation delay concern Single-In Single Out (SISO) architecture in which transmitter delimiting a cell is provided with only one antenna and only one antenna is provided on the receiver (i.e. on the UE). Consequently, in the SISO architecture, there is a single departure point and single arrival point for the signal between the transmitter and the receiver.

When the mobile terminal is located at the edge of the cell, due to the long propagation distance between the transmitter and the mobile terminal, the Signal to Noise Ratio (SNR) tends to be small. As a result, the noise in the estimated impulse response becomes more significant leading to inaccurate first path detection.

Consequently, when the SNR is small, in order to improve the SNR (in other words, to suppress the effect of noise), the estimation of impulse response is repeated many times by transmitting a number of packets from the transmitter to the receiver in order to determine an average or normal.

Figure 1D:
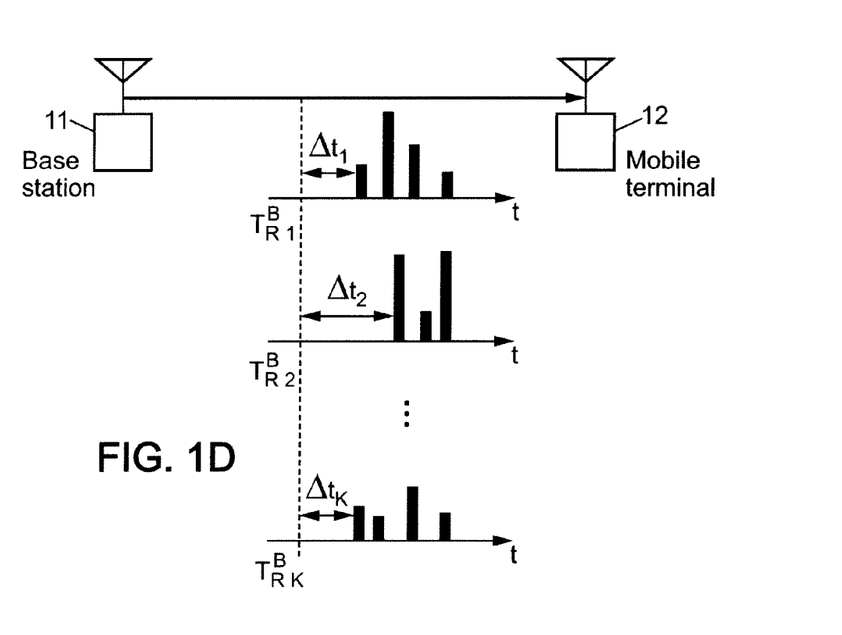
FIG. 1D is a schematic diagram illustrating the utilisation of first arrival path detection in the case of a single-input-single output system of the prior art.

FIG. 1D illustrates the first arrival path detection in the case of a SISO. Assuming the arrival of the first path in the k-th estimation of the impulse response as $\Delta t_k$, the average arrival time of the first path is given by:

$$\Delta \hat{t} = \sum_{k=1}^{K} \frac{1}{K} \Delta t_k. \quad (6)$$

A drawback of this procedure is that since the process requires K estimation processes of the impulse response, i.e. K transmissions of a data packet, it leads to an estimation delay. Furthermore, when the speed of the mobile terminal is high, the averaging operation leads to a large error in estimating the time position of the first arrival path. It is desirable, therefore, that the estimation of the impulse response should be as quick as possible in order to give accurate first arrival path detection.

Further errors in location estimation result from the lack of direct path between the transmitter and the mobile terminal, otherwise known as non-line of sight (NLOS). This can occur, for example, in an urban environment, in which an obstacle such as a building may be located in the path between the transmitter and the mobile terminal. A signal propagating from the transmitter to the mobile terminal may be reflected or scattered by such an obstacle resulting in the signal travelling a greater distance from transmitter to mobile terminal than the actual distance between the transmitter and the mobile terminal.

SUMMARY

Accordingly, it would be advantageous to provide a method of estimating the location of a mobile terminal in which the process of estimation is carried out with reduced time delay. It would also be desirable to provide a method of estimating the location of a mobile terminal in which the effects of NLOS are minimised and the location of a mobile terminal can be determined with increased reliability. It would further be desirable to provide a mobile terminal which could operate with such a method.

To better address one or more of the foregoing concerns, in accordance with a first aspect of the invention there is provided a method of estimating the location of a mobile radio-communication terminal, the mobile terminal being in communication range of at least one transmitter, at least one of the mobile terminal and the transmitter having a plurality of antenna(s) for transmitting and/or receiving (radio frequency) RF signals, the method comprising; determining the time of arrival of a signal transmitted from the M antenna(s) of the at least one transmitter at each of the N antenna(s) of the mobile terminal to determine M×N range measurements corresponding to the M×N transmission paths of said signal between the M antenna(s) of the transmitter and the N antennas of the mobile terminal; and estimating, using a least square method, the location of the mobile terminal based on the M×N range measurements, where M and/or N≥2.

Accordingly, there is less delay in the estimation process compared to prior art techniques since M×N measurements may be obtained at a time, i.e. per signal or data packet transmitted. An estimation of the terminal location may be provided more quickly, and with less error originating from time delay in the estimation process when the mobile terminal is moving around.

In a particular embodiment the location of the mobile terminal is estimated by applying a least squares method based on measured ranges and estimated ranges. By applying a least squares technique a more reliable estimation of the geographical location of the mobile terminal may be obtained.

The least squares method may be based on a minimum selection technique to select the minimum range measurement of the M×N range measurements for each signal transmission. Such a technique helps to minimise the effects of NLOS measurements.

A plurality K signals may be sent from the M antennas of the transmitter (21_j) to N antennas of the mobile terminal (22) such that K×M×N range measurements are obtained, the least squares method being minimised through K iterations.

In an embodiment of the invention, a plurality J of transmitters (21_j) each transmit a signal to the mobile terminal (22) such that J×K×M×N range measurements are obtained, the least squares method being minimised through J×K iterations. By increasing the number of transmitters the accuracy of estimation location may be improved.

In embodiments of the invention:
the location $(\hat{x},\hat{y})$ of the mobile terminal (22) may be estimated by minimising through J×K×M×N terms, the least squares expression:

$$e_{LS} = \sum_{j=1}^{J} \sum_{k=1}^{K} \sum_{m=1}^{M} \sum_{n=1}^{N} |d_{jk}^{mn} - d_{jk}(\hat{x}, \hat{y})|^2$$

where:

$d_{jk}^{mn}$ is the range measurement obtained for each signal transmission path where j represents the transmitter number (1 to J) of J transmitters where J≥1, k represents the transmitted signal (1 to K) of K transmitted signals of the j_th transmitter where K≥1, m the transmitting antenna number (1 to M) of the j-th transmitter provided with M antennas, and n the receiving antenna number (1 to N) of the mobile terminal (22) provided with N antennas, and $d_{kj}(\hat{x},\hat{y})$ is the calculated range derived from $\|x-X\|$, where x are the estimated co-ordinates $[x,y]^T$ of mobile terminal (22) and X are the known co-ordinates $[X_j,Y_j]^T$ of the j-th transmitter (21_j), where and J≥1 and K≥1.

the location $(\hat{x},\hat{y})$ of the mobile terminal (22) may alternatively be estimated by minimising through J×K terms, the expression:

$$e_{LS} = \sum_{j=1}^{J} \sum_{k=1}^{K} |\tilde{d}_{jk} - d_{jk}(\hat{x}, \hat{y})|^2$$

where:

$$\tilde{d}_{jk} = \frac{1}{MN} \sum_{m=1}^{M} \sum_{n=1}^{N} d_{jk}^{mn}$$

the location $(\hat{x}, \hat{y})$ of the mobile terminal (22) may alternatively be estimated by minimising through J×K terms, the expression:

$$e_{LS} = \sum_{j=1}^{J} \sum_{k=1}^{K} |\tilde{d}_{jk} - d_{jk}(\hat{x}, \hat{y})|^2$$

where:

$$\tilde{d}_{jk} = \min_{jk}(d_{jk}^{11}, \ldots, d_{jk}^{mn}, \ldots, d_{JK}^{MN})$$

the time of arrival of the signal at each of the N antennas of the mobile terminal (22) can be measured by detecting the first arrival path in the respective response of the respective receiving antenna to a spread spectrum signal of the transmitted signal.

According to a second aspect of the invention, there is provided a location estimation module for estimating the location of a mobile terminal having a plurality N of antennas, the module comprising a detector for determining the time of arrival of a signal transmitted from M antennas of at least one transmitter at each of the N antennas of the mobile terminal to determine M×N range measurements corresponding to the M×N transmission paths of said signal between the M antennas of the transmitter and the N antennas of the mobile terminal; and a processor for estimating the location of the mobile terminal based on the M×N range measurements.

According to a third aspect of the invention there is provided a mobile telecommunication terminal comprising a plurality of antennas for receiving a radio signal from a transmitter and a location estimation module as hereinbefore described for estimating the location of the mobile terminal.

The method according to the invention may be computer implemented. The method may be implemented in software on a programmable apparatus. It may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

A further aspect of the invention provides a telecommunication system for estimating the location of a mobile telecommunication terminal, the system comprising a transmitter having a plurality of antennas for transmitting and receiving radio signals; and a mobile telecommunication terminal as hereinbefore described.

BRIEF DESCRIPTION OF THE DRAWINGS

Embodiments of the invention will now be described, by way of example only, and with reference to the following drawings in which:—

DETAILED DESCRIPTION

Figure 2A:
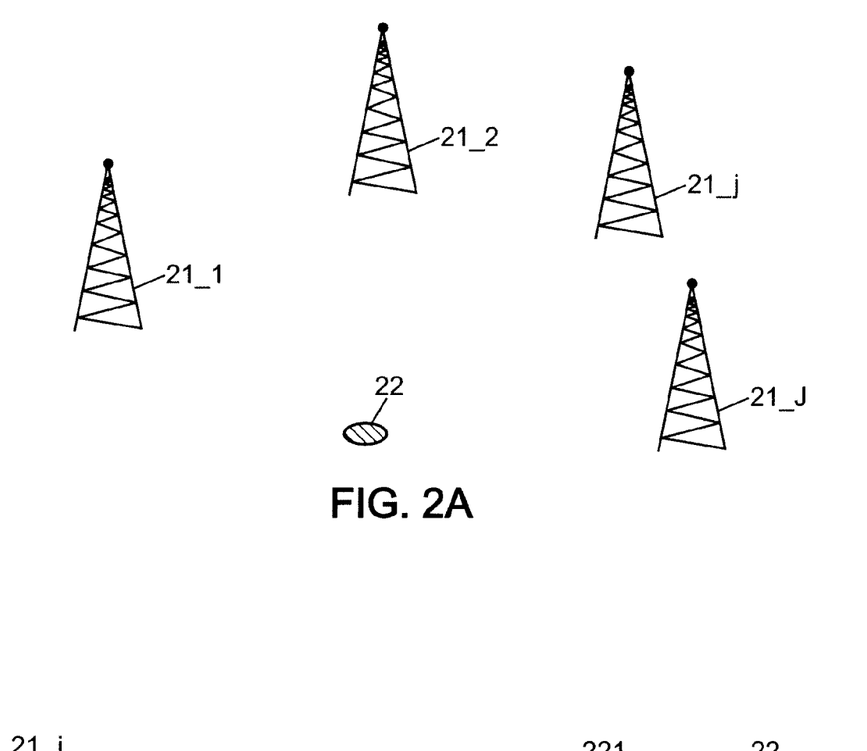
FIG. 2A is a schematic diagram of a system for estimating the location of a mobile terminal according to at least a first embodiment of the invention.
Figure 2B:
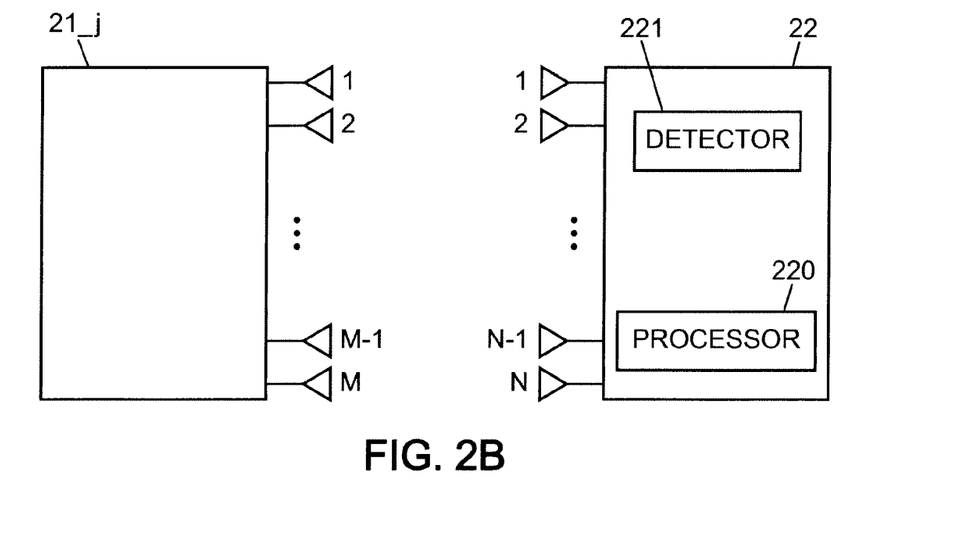
FIG. 2B is a schematic diagram of a mobile terminal and a transmitter in accordance with at least a first embodiment of the invention.

A first embodiment of a method and system for estimating the location of a mobile terminal 22 according to the invention will be described with reference to FIGS. 2A to 5. Referring to FIG. 2A the mobile terminal 22 is in (radio freauency) RF communication range of a number J of base stations, 21_1, 21_2, ... 21_j ... 21_J, positioned at different locations from the mobile terminal 22. FIG. 2B illustrates in more detail the mobile terminal 22 and one of the base stations 21_j of the plurality of J base stations. Mobile terminal 22 may be a User Equipment (UE) such as a mobile telephone, a laptop or any like device. is provided with N antennas for receiving and transmitting radio waves where N≥2, a timing device 221 for detecting the arrival of signals at the terminal 22 and a processor 220 for processing timing information to provide an estimation of the location of mobile terminal 22. Base station 21_j is provided with M antennas for transmitting and receiving radio waves where M≥2.

Since the mobile terminal 22 and the base station 21_j are each provided with a plurality of antennas, the principle of Multiple-Input and Multiple-Output (MIMO) is employed. MIMO is the use of multiple antennas at a transmitter and/or at a receiver to provide multiple signal paths between the transmitter and the receiver. Such a configuration helps to improve communication performance and is one of several forms of Smart Antenna (SA), and state of the art of SA technology. MIMO technology is advantageous in wireless communications, since it offers significant increases in data throughput and link range without additional bandwidth or transmit power. It achieves this by higher spectral efficiency (more bits per second per hertz of bandwidth) and link reliability or diversity (reduced fading).

Since in this embodiment of the invention, both the base station 21_j (i.e. the transmitter) and the mobile terminal 22 (i.e. the receiver) are provided with multiple antennas a plurality of different transmission paths are provided between the base station 21_1 and the mobile terminal 22, more specifically M×N paths or ranges are provided between the M antennas of the base station 21_1 and the N antennas of the mobile terminal 22.

Figure 3A:
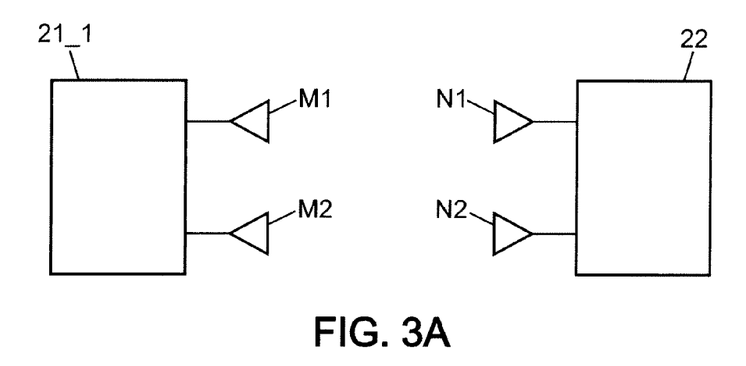
FIG. 3A is a schematic diagram of a mobile terminal and a transmitter each provided with two antennas.

For the sake of illustration, an example of the number of transmission paths provided between a base station 21_1 having 2 terminals and a mobile terminal 22 having 2 terminals is shown in FIG. 3A. In this example the number of transmission paths between base station 21_1 and mobile terminal 22 is 4 since there is a first path between base station antenna M1 and mobile terminal antenna N1, a second path between base station antenna M1 and mobile terminal antenna N2, a third path between base station antenna M2 and mobile terminal antenna N1, and a fourth path between base station antenna M2 and mobile terminal antenna N2.

Figure 3B:
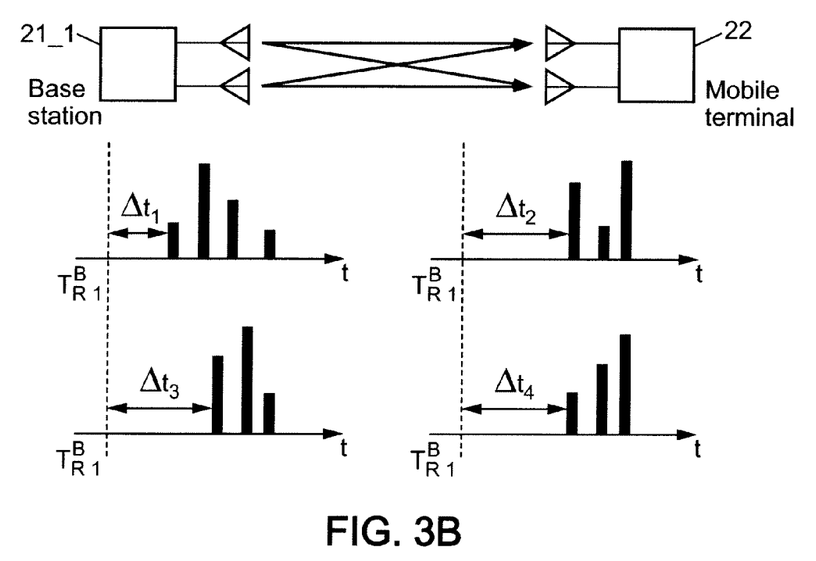
FIG. 3B is a schematic diagram illustrating the application of first arrival path detection for the mobile terminal of FIG. 3A.
Figure 4:
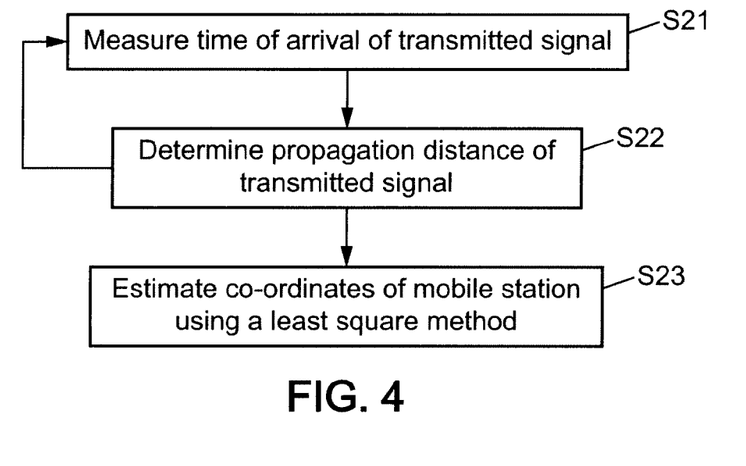
FIG. 4 is a flow diagram illustrating the steps of a method for estimating the location of a mobile terminal according to at least the first embodiment of the invention.

For each transmission path, in step S21 of the method according to the embodiment of the invention, the first arrival path between the base station 21 and the mobile terminal 22 is detected. As illustrated in FIG. 3B, in order to detect the first arrival path, the time occurrence of the first pulse of the impulse response of the mobile terminal 22 is measured. For the example illustrated in FIG. 3A this leads to 4 measurements of first arrival path delay $\Delta t_i$ where $\Delta t$ corresponds to the delay between starting point of correlation $T_R^B{}_1$ and the time occurrence of the first pulse and i corresponds to the transmission path number 1 to 4 between the base station 21_1 and the mobile terminal 22.

In the case of FIG. 2A there are M×N paths, namely M×N distances or ranges to be measured between the base station 21_j and the mobile terminal 22. The mobile terminal can detect M×N first arrival paths for each data packet transmitted from the base station 21_j.

The time required for providing a sufficient number of measurements to estimate an average arrival time is reduced with respect to the case of SISO technology since M×N measurements can be taken from a single packet transmission instead of repeating M×N separate transmissions as in the case of single path transmission. The average arrival time delay of the first arrival path can be given by:

$$\Delta \hat{t} = \sum_{i=1}^{I} \frac{1}{I} \Delta t_i \qquad (7)$$

where I represents the total number of measurements=M×N× K, where K is the number of times signal packets are transmitted from the base station 21_j to the mobile terminal 22.

In step S22 of the method of the embodiment, using the time stamp contained in the data field of the data packet transmitted from the base station 21_j which indicates the time of departure of the data packet from the base station 21_j, the time of occurrence of the starting point of correlation, and the detected delay time $\Delta t$ of the first arrival path, a distance or range measurement $d_k^{mn}$ can be determined for each of the M×N transmission paths based on equation (1) where k represents the data packet transmission number, m the transmitting antenna number (1 to M) of base station 21_j and n the receiving antenna number (1 to N) of mobile terminal 22. In this embodiment of the invention it is assumed that the clock of the mobile terminal 22 is synchronised with the clock of the base station 21_j. It will be appreciated that in alternative embodiments of the invention in which the clocks of the base station and the mobile terminal are not synchronised with one another, the time delay between the clocks may be taken into account, for example, by using a two way ranging technique and applying equations (3) to (5).

Steps S21 and S22 of the method are repeated for each transmitted signal k=1 to k=K, for each of the base stations j=1 to j=J.

Figure 5:
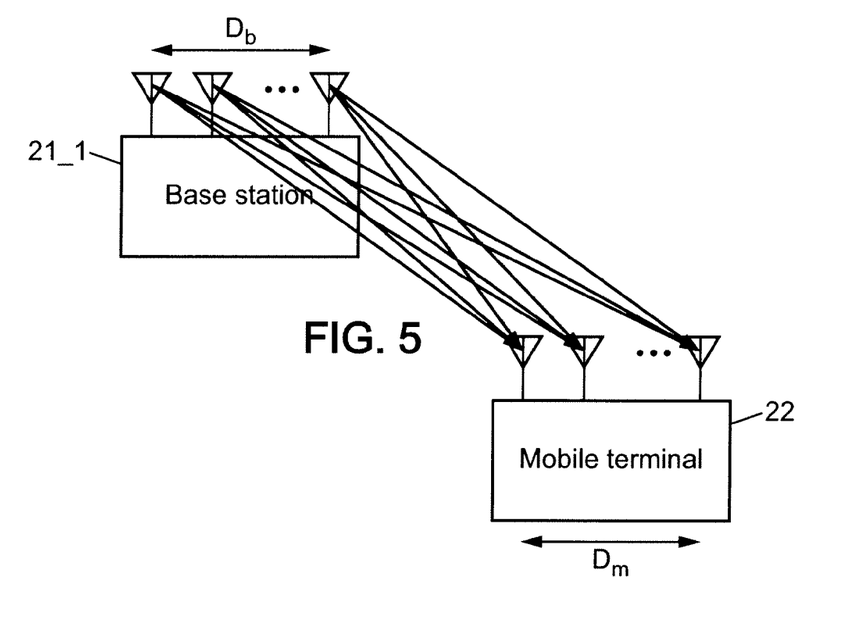
FIG. 5 is a schematic diagram illustrating a system for estimating the location of a mobile terminal according to at least the first embodiment of the invention.

In some cases it may be important to take into account the effect of antenna apertures of the base station 21_j and the mobile terminal 22. With reference to FIG. 5, the aperture of base station 21 Db may be relatively large, for example, <10 m, whereas that of mobile terminal 22 Dm can be small, for example, <several 10 cm. In comparison to the distance between the base station 21_j and the mobile terminal 22, the antenna aperture Dm at the mobile terminal 22 is negligibly small, whereas in this case the antenna aperture Db at the base station 21_j is less negligible. Therefore, in order to be able to use the estimated impulse responses for the TOA ranging measurements with minimum error from the antennas aperture, a relationship in the estimated impulse response among the antenna apertures, the location of the transmit antenna element and the arrival time of the first path should be determined to improve the accuracy of the time of arrival measurements.

In cases where the aperture of the base station 21_j is negligible with respect to the distance between the base station 21_j and the mobile terminal 22 the geographical location of the transmitter 21_j may be used as the location of the antenna element. In both cases, the location of the transmitting antenna element will be dependent on the location of the transmitter 21_j provided with the transmitting antenna element.

In step S23 of the method according to embodiments of the invention a least squares method may be applied to estimate the location of the mobile terminal. In a first embodiment of the invention a least squares (or residual analysis ranking) method is used to estimate the geographical co-ordinates $(\hat{x}, \hat{y})$ of the mobile terminal 22 by minimizing through J×K× M×N terms, the expression:

$$e_{LS} = \sum_{j=1}^{J} \sum_{k=1}^{K} \sum_{m=1}^{M} \sum_{n=1}^{N} |d_{jk}^{mn} - d_{jk}(\hat{x}, \hat{y})|^2 \qquad (8)$$

where:

$d_{jk}^{mn}$ is the range measurement determined in the previous step S22 for each data packet transmission path of each data packet where j represents the transmitting base station 21_j where j=1 to J, k represents the data packet transmission number (1 to K) for the j-th base station, m the transmitting antenna number (1 to M) of the j-th base station 21_j and n the receiving antenna number (1 to N) of mobile terminal 22, and $d_{jk}(\hat{x}, \hat{y})$ is the estimated range derived from estimated co-ordinates=$\|x-X\|$, where x are the estimated co-ordinates $[x,y]^T$ of mobile terminal 22 and X are the known co-ordinates $[X_j, Y_j]^T$ of the jth base station 21_j, where J≥2 and K≥1.

By applying a least squares estimation method the errors in location estimation can be reduced, and the location of the base station may be used as the location of each transmitting antenna element of the base station since the distance between transmitting antennae of base station 21_j are negligible in comparison to the distance between the base station 21_j and the mobile terminal 22.

In a second embodiment of the invention an alternative method for step S23 consists in estimating the geographical co-ordinates $(\hat{x}, \hat{y})$ of the mobile terminal 22 by minimizing through J×K terms, the expression:

$$e_{LS} = \sum_{j=1}^{J}\sum_{k=1}^{K} |\tilde{d}_{jk} - d_{jk}(\hat{x}, \hat{y})|^2 \quad (9)$$

where:

$$\tilde{d}_{jk} = \frac{1}{MN}\sum_{m=1}^{M}\sum_{n=1}^{N} d_{jk}^{mn} \quad (10)$$

In this embodiment an average of M×N range measurements for each transmitted signal is applied.

A third embodiment of the invention applies an alternative method for step S23 based on a minimum selection technique by finding geographical co-ordinates $(\hat{x},\hat{y})$ of mobile terminal 22 which minimizes through K×J terms the expression:

$$e_{LS} = \sum_{j=1}^{J}\sum_{k=1}^{K} |\tilde{d}_{jk} - d_{jk}(\hat{x}, \hat{y})|^2 \quad (11)$$

with $$\tilde{d}_{jk} = \min_{k}(d_{jk}^{11}, \ldots, d_{jk}^{mn}, \ldots, d_{JK}^{MN}) \quad (12)$$

i.e. for each base station 21_j and for each transmitted signal k from that base station 21_j a minimum distance measurement from the M×N range measurements is selected.

The advantage of the third embodiment of the invention is that it minimizes the effect of the NLOS measurements since an NLOS range measurement will generally be greater than a LOS range measurement. It will be appreciated that estimating the location of a mobile terminal according to the embodiments of the invention hereinbefore described may be carried out partly or entirely by an appropriate module which may be a hardware device or a computer program product loaded and run on processing means, for example of the mobile terminal. It may also be a combination of such a hardware device and computer program The method according to the embodiments of the invention further improves the reliability of location estimation of a mobile terminal such as a UE for future mobile broadband systems opening the way for the implementation of location based services and applications.

The method according to the embodiments of the invention can find applications in indoor coverage and can provide a finer analysis for location, and can provide reliable estimates of the geographical location of a mobile terminal for context awareness algorithms.

Although the present invention has been described hereinabove with reference to specific embodiments, the present invention is not limited to the specific embodiments, and modifications will be apparent to a skilled person in the art which lie within the scope of the present invention.

For instance, although in the above described embodiments spread spectrum signals and first arrival path detection are used to measure the time of arrival of a signal at a receiver, it will be appreciated that in alternative methods and/or signal formats may be used for measurement of time of arrival of a signal at a receiver in order to measure the range between a transmitter and a receiver.

It will also be appreciated that the above described methods may be used in the case where either the transmitter or the mobile terminal is provided with a plurality of antennas while the other is provided with a single antenna since multiple transmission paths will still be provided. For example, the above described methods may be employed with a transmitter having a single antenna and a mobile terminal having a plurality of antennas, or vice versa.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of estimating the location of a mobile terminal, the mobile terminal being in communication range of a transmitter, at least one of the transmitter and the mobile terminal having a plurality of antennas, the method comprising:
    determining the time of arrival of a signal transmitted from M antenna(s) of the transmitter at each of N antenna(s) of the mobile terminal to provide M×N range measurements corresponding to the M×N transmission paths of said signal between the M antenna(s) of the transmitter and the N antenna(s) of the mobile terminal; and
    estimating, using a least square method, the location of the mobile terminal based on the M×N range measurements, and a predetermined location of the transmitter, where M and or N ≥2, and
    wherein the location of the mobile terminal is estimated by minimizing through J×K×M×N terms, the least squares expression:

$$e_{LS} = \sum_{j=1}^{J}\sum_{k=1}^{K}\sum_{m=1}^{M}\sum_{n=1}^{N} |d_{jk}^{mn} - d_{jk}(\hat{x}, \hat{y})|^2$$

where:
    $d_{jk}^{mn}$ is the range measurement obtained for each signal transmission path where
    j represents the transmitter number (1 to J) of J transmitters
    k represents the transmitted signal (1 to K) of K transmitted signals of the j-th transmitter,
    m represents the transmitting antenna number (1 to M) of the j-th transmitter provided with M antennas, and
    n represents the receiving antenna number (1 to N) of the mobile terminal provided with N antennas, and
    $d_{kj}(\hat{x},\hat{y})$ is the calculated range derived from $\|x-X\|$, where x are the estimated co-ordinates $[x,y]^T$ of mobile terminal and X are the known co-ordinates $[X_j,Y_j]^T$ of the j-th transmitter, where J≥1 and K≥1.

2. The method according to claim 1, wherein the time of arrival of the signal at each of the N antennas of the mobile terminal is measured by detecting the first arrival path in the respective response of the respective receiving antenna to a spread spectrum signal of the transmitted signal.

3. A location estimation module for estimating the location of a mobile terminal having a plurality N of antennas, the module comprising:
    a detector for detecting the time of arrival of a signal transmitted from M antennas of at least one transmitter at each of the N antennas of the receiver to provide M×N range measurements corresponding to the M×N transmission paths of said signal between the M antenna(e) of the transmitter and the N antennas of the mobile terminal; and a processor for estimating, using a least square method, the location of the mobile terminal based on the M×N range measurements and the location of the at least one transmitter, wherein the processor is operable to estimate the location of the mobile terminal by minimizing through J×K×M×N terms, the expression:

$$e_{LS} = \sum_{j=1}^{J}\sum_{k=1}^{K}\sum_{m=1}^{M}\sum_{n=1}^{N} |d_{jk}^{mn} - d_{jk}(\hat{x},\hat{y})|^2$$

where:

$d_{jk}^{mn}$ is the range measurement obtained for each signal transmission path where j represents the transmitter number (1 to J) of J transmitters k represents the transmitted signal (1 to K) of K transmitted signals of the j-th transmitter, m represents the transmitting antenna number (1 to M) of the j-th transmitter provided with M antennas, and n represents the receiving antenna number (1 to N) of the mobile terminal provided with N antennas, and $d_{kj}(\hat{x},\hat{y})$ is the calculated range derived from $\|x-X\|$, where x are the estimated co-ordinates $[x,y]^T$ of mobile terminal and X are the known co-ordinates $[X_j,Y_j]^T$ of base station j, where J≥1 and K≥1.

4. The location estimation module according to claim 3 wherein the detector is operable to measure the time of arrival of the signal at each of the N antennas of the mobile terminal by detecting the first arrival path in the respective response of the respective receiving antenna to a spread spectrum signal of the transmitted signal.

5. A mobile telecommunication terminal comprising:
a plurality of antennas for receiving a radio signal from a transmitter; and
the location estimation module according to claim 3 for estimating the location of the mobile terminal.

6. A non-transitory computer-readable medium having computer-executable instructions to enable a computer system to perform the method of claim 1.

7. A method of estimating the location of a mobile terminal, the mobile terminal being in communication range of a transmitter, at least one of the transmitter and the mobile terminal having a plurality of antennas, the method comprising:
determining the time of arrival of a signal transmitted from M antenna(s) of the transmitter at each of N antenna(s) of the mobile terminal to provide M×N range measurements corresponding to the MXN transmission paths of said signal between the M antenna(s) of the transmitter and the N antenna(s) of the mobile terminal; and
estimating, using a least square method, the location of the mobile terminal based on the M×N range measurements, and a predetermined location of the transmitter, where M and/or N ≥2, and
wherein the location of the mobile terminal is estimated by minimizing through J×K terms, the expression:

$$e_{LS} = \sum_{j=1}^{J}\sum_{k=1}^{K} |\tilde{d}_{jk} - d_{jk}(\hat{x},\hat{y})|^2$$

where:

$$\tilde{d}_{jk} = \frac{1}{MN}\sum_{m=1}^{M}\sum_{n=1}^{N} d_{jk}^{mn}$$

$d_{jk}^{mn}$ is the range measurement obtained for each signal transmission path where j represents the transmitter number (1 to J) of J transmitters, k represents the transmitted signal (1 to K) of K transmissions for the j-th transmitter, m represents the transmitting antenna number (1 to M) of the j-th transmitter provided with M antennas, and n represents the receiving antenna number (1 to N) of the mobile terminal provided with N antennas, and $d_{kj}(\hat{x},\hat{y})$ is the calculated range derived from $\|x-X\|$, where x are the estimated co-ordinates $[x,y]^T$ of mobile terminal and X are the known co-ordinates $[X_j,Y_j]^T$ of the j-th transmitter, where J≥1 and K≥1.

8. A method of estimating the location of a mobile terminal, the mobile terminal being in communication range of a transmitter, at least one of the transmitter and the mobile terminal having a plurality of antennas, the method comprising:
determining the time of arrival of a signal transmitted from M antenna(s) of the transmitter at each of N antenna(s) of the mobile terminal to provide M×N range measurements corresponding to the MXN transmission paths of said signal between the M antenna(s) of the transmitter and the N antenna(s) of the mobile terminal; and
estimating, using a least square method, the location of the mobile terminal based on the M×N range measurements, and a predetermined location of the transmitter, where M and or N ≥2,
wherein the location of the mobile terminal is estimated by minimizing through J×K terms, the expression:

$$e_{LS} = \sum_{j=1}^{J}\sum_{k=1}^{K} |\tilde{d}_{jk} - d_{jk}(\hat{x},\hat{y})|^2$$

where:

$$\tilde{d}_{jk} = \min_{jk}(d_{jk}^{11},\ldots,d_{jk}^{mn},\ldots,d_{JK}^{MN})$$

$d_{jk}^{mn}$ is the range measurement obtained for each signal transmission path where j represents the transmitter number (1 to J) of J transmitters, k represents the transmitted signal (1 to K) for the j-th transmitter, m represents the transmitting antenna number (1 to M) of the j-th transmitter provided with M antennas, and n represents the receiving antenna number (1 to N) of the mobile terminal provided with N antennas, and $d_{kj}(\hat{x},\hat{y})$ is the calculated range derived from $\|x-X\|$, where x are the estimated co-ordinates $[x,y]^T$ of mobile terminal and X are the known co-ordinates $[X_j,Y_j]^T$ of the j-th transmitter, where J≥1 and K≥1.

9. A location estimation module for estimating the location of a mobile terminal having a plurality N of antennas, the module comprising:
a detector for detecting the time of arrival of a signal transmitted from M antennas of at least one transmitter at each of the N antennas of the receiver to provide M×N range measurements corresponding to the M×N transmission paths of said signal between the M antenna(e) of the transmitter and the N antennas of the mobile terminal; and a processor for estimating, using a least square method, the location of the mobile terminal based on the M×N range measurements and the location of the at least one transmitter, wherein the processor is operable to estimate the location of the mobile terminal by minimizing through J×K terms, the expression:

$$e_{LS} = \sum_{j=1}^{J} \sum_{k=1}^{K} |\tilde{d}_{jk} - d_{jk}(\hat{x}, \hat{y})|^2$$

where:

$$\tilde{d}_{jk} = \frac{1}{MN} \sum_{m=1}^{M} \sum_{n=1}^{N} d_{jk}^{mn}$$

$d_{jk}^{mn}$ is the range measurement obtained for each signal transmission path where j represents the transmitter number (1 to J) of J transmitters, k represents the transmitted signal (1 to K) of K transmitted signals of the j-th transmitter, m represents the transmitting antenna number (1 to m) of the j-th transmitter provided with M antennas, and n represents the receiving antenna number (1 to N) of the mobile terminal provided with N antennas, and $d_{kj}(\hat{x},\hat{y})$ is the calculated range derived from $\|x-X\|$, where x are the estimated co-ordinates $[x,y]^T$ of mobile terminal and X are the known co-ordinates $[X_j,Y_j]^T$ of base station j, where J≥1 and K≥1.

10. A location estimation module for estimating the location of a mobile terminal having a plurality N of antennas, the module comprising:

a detector for detecting the time of arrival of a signal transmitted from M antennas of at least one transmitter at each of the N antennas of the receiver to provide M×N range measurements corresponding to the M×N transmission paths of said signal between the M antenna(e) of the transmitter and the N antennas of the mobile terminal; and a processor for estimating, using a least square method, the location of the mobile terminal based on the M×N range measurements and the location of the at least one transmitter, wherein the processor is operable to estimate the location $(x,y)$ of the mobile terminal by minimizing through J×K terms, the expression:

$$e_{LS} = \sum_{j=1}^{J} \sum_{k=1}^{K} |\tilde{d}_{jk} - d_{jk}(\hat{x}, \hat{y})|^2$$

where:

$$\tilde{d}_{jk} = \min_{jk}(d_{jk}^{11}, \ldots, d_{jk}^{mn}, \ldots, d_{JK}^{MN})$$

$d_{jk}^{mn}$ is the range measurement obtained for each signal transmission path where j represents the transmitter number (1 to J) of J transmitters, k represents the transmitted signal (1 to K) of K transmitted signals of the j-th transmitter, m represents the transmitting antenna number (1 to M) of the j-th transmitter provided with M antennas, and n represents the receiving antenna number (1 to N) of the mobile terminal provided with N antennas, and $d_{kj}(\hat{x},\hat{y})$ is the calculated range derived from $\|x-X\|$, where x are the estimated co-ordinates $[x,y]^T$ of mobile terminal and X are the known co-ordinates $[X_j,Y_j]^T$ of base station j, where J≥1 and K≥1.

\* \* \* \* \*